Patented Jan. 1, 1952

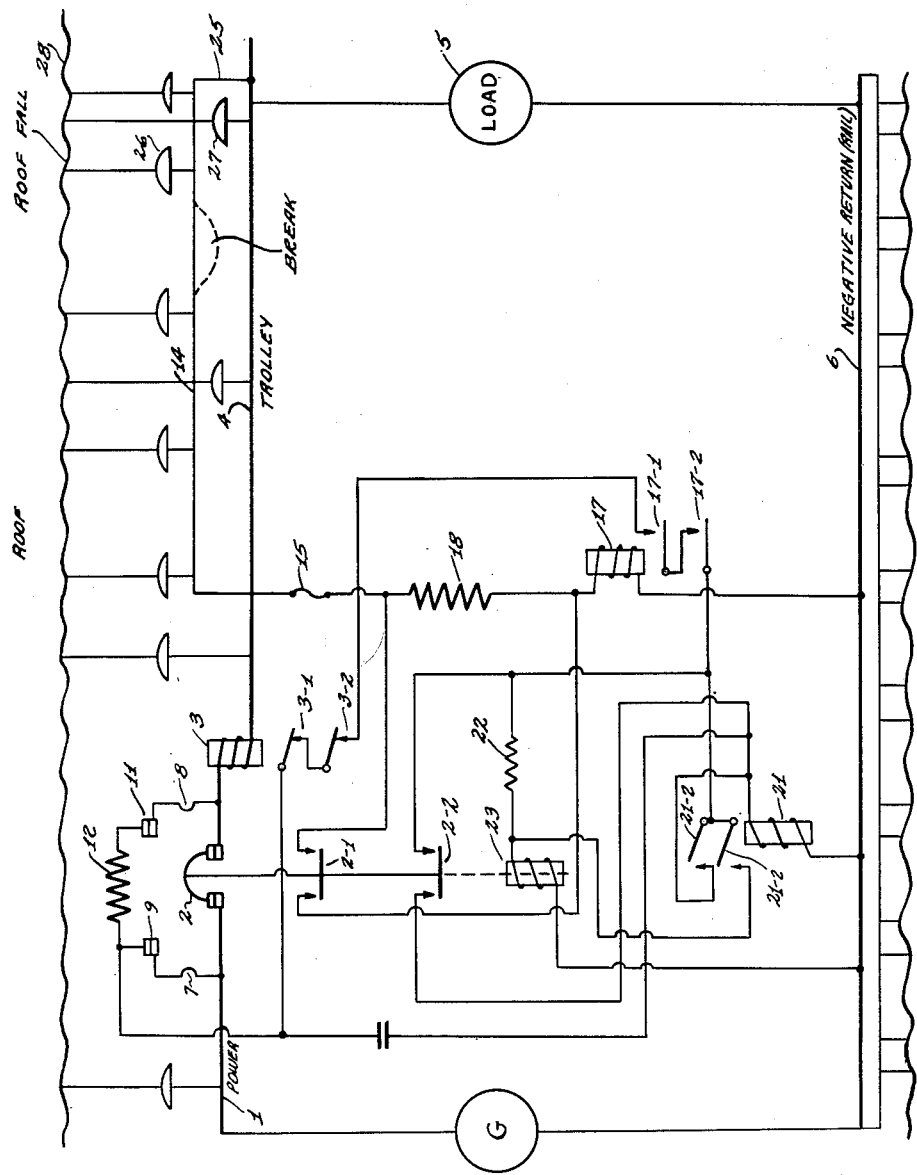

2,580,858

UNITED STATES PATENT OFFICE 2,580,858

PILOT WIRE CONTROL FOR AUTOMATIC RECLOSING CIRCUIT BREAKERS

William L. Sprengle, Pittsburgh, Pa., assignor to I-T-E Circuit Breaker Company, Philadelphia, Pa., a corporation of Pennsylvania Application June 27, 1946, Serial No. 679,597

1 Claim. (Cl. 175—294)

My invention relates to electric power systems and more particularly relates to control of power circuits in mines.

In the operation of power circuits in mines, automatic reclosing circuit breakers are employed for the protection of the power lines. A fire hazard, however, is created when for any reason the overhead trolley which carries electric power breaks, due, for example, to a falling roof. In such cases reclosing of the circuit breaker recreates the short circuit which may initiate fires of a serious nature.

In such cases, it is desirable that the automatic reclosing circuit breaker shall not reclose as it normally would when tripped in response to a short circuit or other circuit fault conditions. A reclosing of the circuit breaker when a mechanical failure such as a falling roof occurs may result in serious fires.

In accordance with my present invention I have provided a pilot wire, the condition of which determines whether the breaker will reclose after being tripped open. If the mine roof falls, the pilot wire breaks and completes circuits with the trolley such that the automatic circuit breakers controlling power fed to the trolley is opened and held opened until repairs are effected. When the repairs are completed and the pilot wire restored to operation, the circuit breaker automatically closes without requiring manual operation. This is important inasmuch as the circuit breaker is located at a considerable distance from where the break may occur.

Accordingly, an object of my invention is to provide a novel circuit arrangement in connection with automatic reclosing circuit breakers which in response to faulty conditions has opened and stays opened until the fault is repaired.

A further object of my invention is to provide novel circuit arrangements whereby an automatically reclosing circuit breaker is automatically closed when the fault is repaired.

Still another object of my invention is to provide novel load measuring conditions for controlling the reclosing of an automatic circuit breaker.

These and other objects of my invention will be more fully understood in connection with the attached drawing which is a schematic circuit diagram of my invention.

Normally, power is supplied from the power line 1, through the closed contacts of the circuit breaker 2, through the overcurrent relay 3, to the trolley 4, which feeds energy through the load 5, to the negative return which may be a rail 6. If a fault occurs, circuit breaker 2 is automatically tripped open in response to the overload currents which will flow through the overcurrent relay 3, in a manner which is well known in the art.

Normally, the circuit breaker will after a short interval of time, test the condition of the circuit and will reclose.

In the present invention it is desired that such reclosing of the breaker be prevented in the event that the fault has been due to a falling roof, which as stated above creates a condition which may become a fire hazard unless power is immediately cut off.

Assuming now that the circuit breaker 2 is in open position due to a fault, a circuit extends from power line 1 to trolley 4, which shunts the contacts of the circuit breaker 2. This circuit includes the two fuses 7 and 8 (which in the present illustration are 10 ampere fuses), and connected in series with these fuses are contacts 9 and 11 and the load measuring resistance 12. Contacts 9 and 11 are control switches which may be manually operated but are normally in closed position.

When, therefore, the circuit breaker 2 opens, current from the power line is still fed over this by-pass circuit. Upon the opening of the circuit breaker, therefore, current is supplied to the trolley 4, over the above named by-pass. This circuit extends to the pilot wire 14, over conductor 25, through fuse 15, through contact 2—1, the winding of relay 17, and to the negative return 6. Contact 2—1 in the above described circuit is mechanically connected to the circuit breaker in such a manner that it is open when the circuit breaker is closed and is closed a short interval of time after the circuit breaker opens. It will be noted that this circuit by-passes the resistor 18 which is of such size as to cause a considerable voltage drop therein so as to prevent operation of the relay. When, however, the by-pass circuit is complete on the closing of contacts 2—1, the relay winding 17 is directly connected across the load 5 and measures the voltage of this load. Current through the winding 17 is sufficient depending on the load condition to operate its armatures.

Upon energization of the relay 17, to effect operation of its armatures to their closed position, an energizing circuit is completed from the power line 1 through contact 9, through normally closed contacts 3—1 and 3—2 controlled by the overcurrent relay 3 (now de-energized), through the contacts 17—1 and 17—2 of relay 17 (which is now energized and therefore has operated its armatures to their front engaging positions) through contact 2—2 (which as in the case of contact 2—1 is controlled to its closed position when the circuit breaker is opened) and through the winding of the relay 21 to the negative return circuit 6. Relay 21 is the closing control relay and when energized controls the circuit for the reclosing magnet.

Upon energization of closing control relay 21, its contacts 21—1 and 21—2 are closed, by-passing the resistor 22 and completing an energizing circuit for the circuit breaker reclosing magnet 23. The circuit breaker 2 is therefore reclosed.

On reclosing of the circuit breaker, contacts 2—1 and 2—2 are opened. Opening of contact 2—1 has no effect on relay 17 since this relay finds an energizing circuit through resistance 18. Although as heretofore explained the current in this latter circuit is insufficient to pull up the armatures of relay 17, it is sufficient to maintain the armature in operative position. Opening of contact 2—2, however, effects de-energization of relay 21.

In the above operations which occur when the circuit breaker opens for any reason other than a failure of the roof, it will be noted that relay 17, which is the load measuring resistance and which, it will be noted, is connected across the load when the circuit breaker opens, is dependent for its energization on current flowing through the pilot wire 14.

It will now be assumed that the circuit breaker is opened by a short circuit caused by a falling roof. The pilot wire 14 breaks as indicated at the dotted line. The pilot wire is an insulated solid copper wire which in practice is stretched between insulators one mile long or less, and is electrically connected to the trolley wire at 25. The trolley wire 4 and the pilot wire are suspended by insulators 26 and 27 from a roof 28 as in the case of a coal mine. In normal operations, a failure of the trolley circuit does not effect the pilot wire 14 as described above. When, however, the roof falls the pilot wire breaks at the time the short circuit occurs and the operations now about to be described occur.

When the pilot wire breaks, as for example, due to a falling roof, the connection between the trolley and the pilot wire is broken. There is, therefore, no energizing circuit for the load measuring relay closing coils 17. This relay, it will be recalled, was energized and remained energized on the first opening of the circuit breaker.

When now the break in the pilot wire occurs as described above and the circuit breaker is tripped because of a short circuit of trolley wire 14, the energizing circuit for the winding 17 is opened, and this relay deenergizes if it had previously been energized or it stays deenergized when the circuit breaker opened, if not previously deenergized.

The deenergized condition to the winding 17 leaves the contacts 17—1 and 17—2 opened, so that although contacts 2—2 closes there is no energizing circuit for the closing control relay 21 and this relay therefore is deenergized. Moreover, the opening of the contacts 17—1 and 17—2 also opens the energizing circuit for the circuit breaker closing coil 23. Accordingly, the circuit breaker is tripped and stays tripped preventing power from being fed to the trolley 4 except through the load measuring resistor 12.

When the pilot wire is repaired there is immediately supplied to the load measuring relay closing coil 17, sufficient current to energize this winding. Therefore, reclosing of the circuit breaker is effected in the manner described in detail above.

The operations above described may be summarized as the following sequence of operations:

1. With the circuit breaker 2 in the open position, the control switches 9 and 11 are closed.

2. This by-passes a load-measuring current around the circuit breaker 2, through the load measuring resistor 12, through the load, and back to the negative return.

3. The closing of the time delay closing contacts 2—1 places the load measuring relay closing coils, 17, across the load voltage. If the pilot wire is broken due to a roof fall, relay 17 will not pick up. If the pilot wire is intact, the load measuring relay closing coils 17 are in proper relation for measuring the resistance of the load circuit.

4. If the load conditions are satisfactory, the load measuring relay contacts 17—1, 17—2 close and energize the closing control relay 21, which picks up and short circuits the resistor 22 causing the circuit breaker 2 to close.

5. The closing of the circuit breaker 2, opens the time delay contacts 2—1 which de-energizes the closing control relay 21 and places the resistor 18 in series with the load measuring relay closing coils 17 and the pilot wire.

6. If the pilot wire breaks, these coils are de-energized and the load measuring relay contacts 17—1, 17—2 open, thus opening the circuit breaker 2.

I claim:

In an electrical protective system having a circuit extending from a source of power to a load and including a trolley line and a return line, a pilot wire extending adjacent to and parallel to said trolley line and connected to said trolley line at its terminus, a circuit breaker connected in said circuit, an overload relay connected in said circuit and responsive to a fault at said load for opening said circuit breaker, a relay connectible in series with said pilot wire, a resistor connected across said circuit breaker for providing a circuit from said source to said load when said circuit breaker is opened, means responsive to the opening of said circuit breaker for connecting said relay and pilot wire in series across said load and from said trolley line to said return line for measuring the fault current produced by said fault at said load, circuit connections from said source of power and including said resistor, pilot wire, relay and return circuit for energizing said relay in the event the fault at said load has been cleared, said pilot wire preventing completion of said circuit connection in the event said pilot wire is broken, a closing magnet for closing said circuit breaker, and circuit connections including said closing magnet controlled by said relay on energization thereof for operating said closing magnet to close said circuit breaker.

WILLIAM L. SPRENGLE.

REFERENCES CITED

The following references are of record in the file of this patent:

UNITED STATES PATENTS

| Number | Name | Date |
|---|---|---|
| 345,533 | Woods | Jan. 1, 1889 |
| 554,263 | Guilleaume | Feb. 11, 1896 |
| 1,710,895 | Raney | Apr. 30, 1929 |
| 2,259,965 | Taliaferro | Oct. 21, 1941 |
| 2,345,155 | Reagan | Mar. 28, 1944 |

FOREIGN PATENTS

| Number | Country | Date |
|---|---|---|
| 9,056 | Great Britain | May 7, 1895 |
| 4,088 of 1901 | Great Britain | Feb. 26, 1902 |
| 14,463 | Great Britain | July 8, 1908 |